(12) United States Patent
Shinohara et al.

(10) Patent No.: US 7,972,582 B2
(45) Date of Patent: Jul. 5, 2011

(54) METHOD AND APPARATUS FOR TREATING EXHAUST GAS

(75) Inventors: Toyoji Shinohara, Tokyo (JP); Yoichi Mori, Tokyo (JP); Yasuhiko Suzuki, Tokyo (JP); Hiroshi Aono, Tokyo (JP); Yuji Shirao, Tokyo (JP)

(73) Assignee: Ebara Corporation, Tokyo (JP)

( * ) Notice: Subject to any disclaimer, the term of this patent is extended or adjusted under 35 U.S.C. 154(b) by 2376 days.

(21) Appl. No.: 10/482,683

(22) PCT Filed: Nov. 29, 2002

(86) PCT No.: PCT/JP02/12520
§ 371 (c)(1),
(2), (4) Date: May 13, 2004

(87) PCT Pub. No.: WO03/047729
PCT Pub. Date: Jun. 12, 2003

(65) Prior Publication Data
US 2004/0191146 A1     Sep. 30, 2004

(30) Foreign Application Priority Data
Dec. 4, 2001   (JP) .................................. 2001-370656

(51) Int. Cl.
*B01D 53/00*   (2006.01)
*B01D 53/34*   (2006.01)
*B01D 53/68*   (2006.01)
*B01D 53/92*   (2006.01)
*B01D 53/94*   (2006.01)

(52) U.S. Cl. ................ 423/240 R; 423/240 S; 423/246; 423/247; 422/173; 422/177

(58) Field of Classification Search .................. 423/210, 423/240 R, 241, 242.1, 243.01, 243.02, 243.03, 423/243.11, 243.12, 244.01, 244.02, 244.03, 423/244.04, 244.09, 244.11, 246, 215.5
See application file for complete search history.

(56) References Cited

U.S. PATENT DOCUMENTS

| | | | |
|---|---|---|---|
| 5,804,149 A | * | 9/1998 | Ota et al. ........................ 422/174 |
| 2001/0001652 A1 | | 5/2001 | Kanno et al. |
| 2001/0031228 A1 | | 10/2001 | Irie et al. |

FOREIGN PATENT DOCUMENTS

| | | |
|---|---|---|
| EP | 0 916 388 | 5/1999 |
| EP | 1 101 524 | 5/2001 |
| EP | 1 129 775 | 9/2001 |
| EP | 1 228 800 | 8/2002 |
| JP | 7-323211 | 12/1995 |
| JP | 11-70322 | 3/1999 |
| JP | 11-319485 | 11/1999 |
| JP | 2000-323414 | 11/2000 |
| JP | 2001-137659 | 5/2001 |
| JP | 2001-293335 | 10/2001 |
| JP | 2002-224535 | 8/2002 |

* cited by examiner

*Primary Examiner* — Scott Kastler
*Assistant Examiner* — Vanessa Velasquez
(74) *Attorney, Agent, or Firm* — Wenderoth, Lind & Ponack, L.L.P.

(57) ABSTRACT

An apparatus for treating an exhaust gas that includes a pretreatment section that removes a powdery component, a water-soluble component or a hydrolytic component from the exhaust gas. The exhaust gas contains a fluorine compound and CO. A heating oxidative decomposing section performs heating oxidative decomposition of at least one of the fluorine compound and CO to detoxify the exhaust gas. The apparatus also has a post-treatment section for post-treating an acid gas such as HF which has been produced by the heating oxidative decomposition.

4 Claims, 2 Drawing Sheets

METHOD AND APPARATUS FOR TREATING EXHAUST GAS

TECHNICAL FIELD

The present invention relates to a method and apparatus for treating an exhaust gas, and more particularly to a method and apparatus for efficiently detoxifying an exhaust gas containing a fluorine compound and a carbon monoxide gas (CO) which is discharged in a semiconductor fabrication process such as a dry-cleaning process of an inner surface of a semiconductor fabrication apparatus or an etching process of various types of films such as oxide films.

BACKGROUND ART

In a semiconductor fabrication process such as an etching process or a chemical vapor deposition (CVD) process, fluorine compounds such as hydrofluorocarbon (e.g., $CHF_3$) or perfluorocompound (e.g., $CF_4$, $C_2F_6$, $C_3F_8$, $C_4F_8$, $C_5F_8$, $C_4F_6$, $SF_6$, and $NF_3$) have been used in a system. In some cases, CO, $NH_3$ or $O_2$ may be used in a semiconductor fabrication apparatus. An exhaust gas discharged from a semiconductor fabrication apparatus which uses fluorine compounds, CO or $NH_3$ includes harmful components such as CO, $NH_3$, $SiF_4$, $F_2$, $COF_2$, $C_5F_8$, $C_4F_6$, or $NF_3$. The exhaust gas also includes fluorine compounds which are not harmful but affect the global warming. Therefore, when an exhaust gas is discharged from a semiconductor fabrication apparatus using fluorine compounds or CO into an environmental atmosphere, it is necessary to detoxify a harmful gas included in the exhaust gas and also to decompose a gas which causes the global warming.

In a conventional method of treating a harmful gas ($SiF_4$, $F_2$, $COF_2$, $C_5F_8$, $C_4F_6$, or $NH_3$) included in an exhaust gas, harmful components are adsorbed by an adsorbent such as a synthetic zeolite. However, in this conventional method, CO or perfluorocompound (PFC) cannot be removed from the exhaust gas. Further, the adsorbent needs to be replaced with a new one periodically, resulting in increased running cost.

A wet scrubber has been used to scrub an exhaust gas for removing a water-soluble gas and a hydrolytic gas such as $SiF_4$, $F_2$ or $NH_3$ from the exhaust gas. However, such a wet scrubber cannot remove gases that are not water-soluble, such as CO and PFC.

In a conventional method of removing CO from an exhaust gas, CO is oxidized into $CO_2$ with an oxidation catalyst and $O_2$. However, in this conventional method, PFC cannot be removed by the decomposition. If an acid gas, such as $SiF_4$ or $F_2$, or PFC is brought into contact with the oxidation catalyst, then the oxidation catalyst is poisoned by the acid gas or PFC to lower its CO oxidation capability. Therefore, the oxidation catalyst needs to be replaced with a new one periodically.

When the aforementioned conventional methods of adsorption, wet scrubbing, and oxidation are combined with each other, it is possible to treat a harmful gas and CO in an exhaust gas simultaneously. However, these treatments need to have components replaced periodically, resulting in increased running cost. Further, PFC still cannot be removed from the exhaust gas with the above combined method.

There has been proposed a method of removing PFC from an exhaust gas with various types of catalysts for decomposing PFC. However, if the catalyst is deteriorated, then harmful components such as CO, $C_5F_8$, and $C_4F_6$ may be discharged into the environmental atmosphere immediately after deterioration of the catalyst. There has also been proposed a method of treating PFC by combustion. However, NOx or CO may be produced as a by-product gas, depending on the combustion conditions. Since this method requires a fuel such as $H_2$, natural gas (city gas), or propane gas, it is necessary to provide equipment for supplying the fuel. Further, a complicated process is required to manage the operation. There has also been proposed a method of decomposing PFC by heating oxidation. However, in order to decompose PFC (e.g., $CF_4$) that is unlikely to otherwise be decomposed, an exhaust gas should be heated to a high temperature of 1400° C. or higher. In such a case, loads applied on materials and a heater in the system become considerably large.

There has been proposed a method in which $NH_3$, a lower saturated hydrocarbon gas, or a lower unsaturated hydrocarbon gas is added to an exhaust gas, and PFC is decomposed by heating oxidation without free $O_2$ gas. However, there has not been proposed a method of heating oxidative decomposing PFC with the coexistence of $O_2$. Further, there has also been proposed a method of decomposing PFC with a plasma in the presence of water ($H_2O$). However, when PFC is decomposed, a harmful gas such as CO or HF is produced and thermal NOx is also produced. Therefore, it is necessary to provide a separate exhaust gas treatment apparatus for treating the harmful gas and the thermal NOx.

SUMMARY OF INVENTION

The present invention has been made in view of the above drawbacks. It is therefore an object of the present invention to provide a method and apparatus for treating an exhaust gas which can treat a fluorine compound and CO simultaneously and efficiently, can reduce manufacturing cost, running cost, and loads on a material of the apparatus, and does not discharge any harmful gas.

According to a first aspect of the present invention, there is provided a method of treating an exhaust gas containing at least one of a fluorine compound and CO, the method comprising: removing at least one of a powdery component, a water-soluble component and a hydrolytic component from the exhaust gas; then adding $O_2$ and $H_2O$ to the exhaust gas; then heating the exhaust gas to decompose or oxidize the at least one of the fluorine compound and CO in the exhaust gas; and removing an acid gas produced when the fluorine compound is decomposed or oxidized from the exhaust gas which has been decomposed or oxidized. The exhaust gas should preferably be heated at a temperature ranging from 700 to 900° C.

According to a preferred aspect of the present invention, the method further comprises decomposing the exhaust gas by catalytic reaction.

According to a preferred aspect of the present invention, the at least one of the powdery component, the water-soluble component and the hydrolytic component is removed from the exhaust gas by adsorption with an adsorbent or by gas-liquid contact.

According to a preferred aspect of the present invention, the acid gas is removed from the exhaust gas by adsorption with an adsorbent or by gas-liquid contact.

According to a second aspect of the present invention, there is provided a method of treating an exhaust gas containing at least one of a fluorine compound and CO, the method comprising: adding $O_2$ and $H_2O$ to the exhaust gas; and heating the exhaust gas to a temperature ranging from 700 to 900° C. to detoxify at least one of CO, a fluorine compound having four or more carbon atoms, a hydrofluorocarbon and $NF_3$ in the exhaust gas.

According to a third aspect of the present invention, there is provided an apparatus for treating an exhaust gas containing at least one of a fluorine compound and CO, the apparatus comprising: a first treatment section for removing at least one of a powdery component, a water-soluble component and a hydrolytic component from the exhaust gas; a heating oxidative decomposing section for performing heating oxidative decomposition of the at least one of the fluorine compound and CO to detoxify the exhaust gas; an $O_2$ supply for supplying $O_2$ to the heating oxidative decomposing section; an $H_2O$ supply for supplying $H_2O$ to the heating oxidative decomposing section; and a second treatment section for removing an acid gas in the exhaust gas after the heating oxidative decomposition.

According to a preferred aspect of the present invention, the apparatus further comprises a catalytic reaction section for decomposing the exhaust gas by catalytic reaction.

According to the present invention, a harmful gas such as $SiF_4$ or $F_2$ can be removed from the exhaust gas by adsorption or gas-liquid contact so as to have a concentration of a permissible value (TLV-TWA value) or lower. Preferably, with the heating oxidation at a temperature ranging from 700 to 900° C., CO is oxidized into $CO_2$ without the use of a catalyst for oxidizing CO, so that the concentration of CO is reduced to a permissible value (TLV-TWA value) or lower. According to the present invention, a harmful PFC such as $C_4F_6$, $C_5F_8$, or $NF_3$ can also be decomposed completely by heating, so that the concentration of the harmful PFC is reduced to a permissible value (TLV-TWA value) or lower. Further, an acid gas such as HF produced when the fluorine compound is decomposed by heating oxidative decomposition can be removed by subsequent adsorption or gas-liquid contact. Therefore, components in the exhaust gas that are considered to be harmful to human bodies can be detoxified without heating oxidative decomposition at a temperature of 1000° C. or higher or catalytic reaction. It is difficult to decompose PFC (e.g., $CF_4$) by heating at a temperature ranging from 700 to 900° C. Although such PFC is problematic in view of the global warming or the like, it is not harmful to human bodies. Thus, according to the present invention, components that are harmful to human bodies can be removed to have a concentration of a permissible value or lower.

Further, PFC (e.g., $CF_4$) that is unlikely to be decomposed can completely be decomposed at a relatively low temperature of 600 to 900° C. by catalytic reaction. For example, when catalytic reaction is performed after the heating oxidative decomposition, gas components that need to be treated in view of the global warming can completely be decomposed and removed.

The above and other objects, features, and advantages of the present invention will be apparent from the following description when taken in conjunction with the accompanying drawings which illustrate preferred embodiments of the present invention by way of example.

DETAILED DESCRIPTION OF THE INVENTION

An exhaust gas treatment apparatus according to embodiments of the present invention will be described below with reference to FIGS. 1 through 4.

Figure 1:
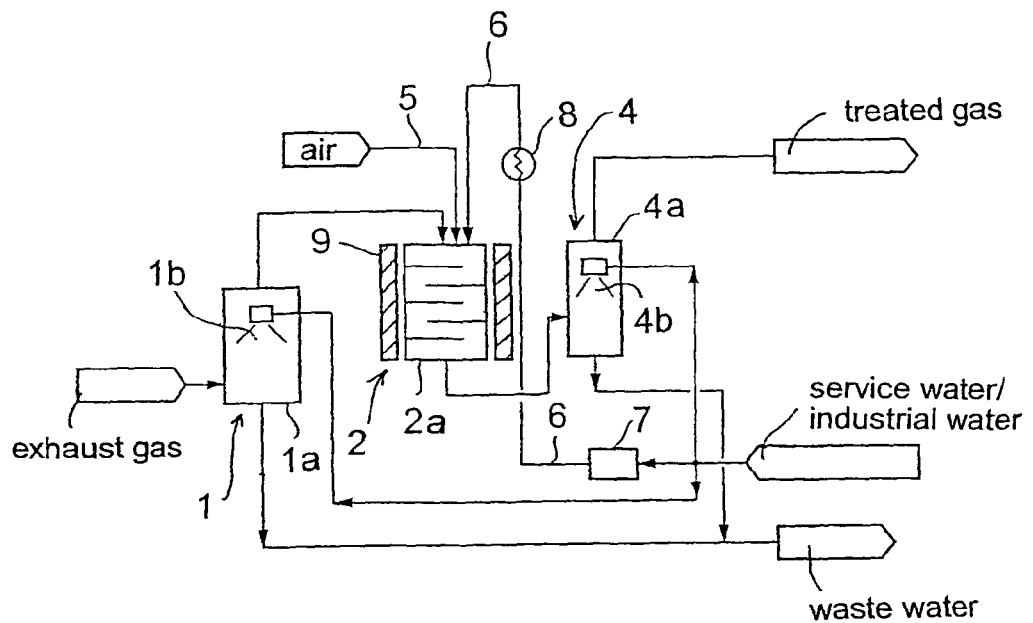
FIG. 1 is a block diagram showing an exhaust gas treatment apparatus according to a first embodiment of the present invention.

FIG. 1 shows an exhaust gas treatment apparatus according to a first embodiment of the present invention. As shown in FIG. 1, the exhaust gas treatment apparatus comprises a pre-treatment section 1 for removing powdery components, water-soluble components, or hydrolytic components from an exhaust gas containing fluorine compounds and carbon monoxide (CO), a heating oxidative decomposing section 2 for performing heating oxidative decomposition of the pre-treated exhaust gas, and a post-treatment section 4 for post-treating an acid gas such as HF which has been produced by the heating oxidative decomposition.

The pre-treatment section 1 may comprise a water spray tower 1a for pre-treatment by gas-liquid contact, for example. The spray tower 1a is supplied with service water or industrial water, which is sprayed from a water spray 1b provided in the spray tower 1a. The exhaust gas containing fluorine compounds and CO is supplied into a lower portion of the water spray tower 1a and flows upward into contact with the water sprayed from the water spray 1b. In such a wet scrubbing process, powdery components, water-soluble components, or hydrolytic components are removed from the exhaust gas. Instead of the water spray tower 1a, the pre-treatment section 1 may comprise a fan scrubber, a gas passage stirring tank, or an adsorption tank filled with an adsorbent such as zeolite or activated carbon. The fan scrubber, the gas passage stirring tank, and the adsorption tank can also achieve the aforementioned effects.

Devices to be used as the pre-treatment section 1 can properly be selected according to components in the exhaust gas to be treated, a degree to which powders are mixed, or states of the plant. Since an adsorption tank filled with an adsorbent uses no water, it is suitable for a case where no waste water treatment equipment is provided in the system. If the exhaust gas contains materials which should specially be maintained, such as arsenic (As) or lead (Pb) then waste water used in the wet scrubbing process is contaminated by such materials. For such cases, the wet scrubbing process is not suitable, but the adsorption process is suitable. The fan scrubber has a high rate of removal of the components with a small amount of water being supplied. Further, the fan scrubber has an excellent capability of capturing powders. Although the water spray tower 1a requires an increased amount of water to be supplied in order to achieve a high rate of removal of the components, the water spray tower 1a can reduce cost of the apparatus because of its simple structure. A liquid in the gas passage stirring tank can be adjusted in pH by a neutralizing liquid supplied thereto. Therefore, the gas passage stirring tank has a high rate of removal of components that would be difficult to be removed by another wet scrubbing process.

In the pre-treatment section 1, as described above, powdery components, water-soluble components, or hydrolytic components are removed from the exhaust gas with water or an adsorbent. For example, an acid gas such as $SiF_4$ or $F_2$ is removed from the exhaust gas in the pretreatment section 1.

The exhaust gas which has passed through the pretreatment section 1 is introduced into the heating oxidative decomposing section 2 and decomposed therein. The heating oxidative decomposing section 2 has a heating oxidative decomposing reactor 2a where the decomposing process is performed, an air pipe ($O_2$ supply pipe) 5 connected to the heating oxidative decomposing reactor 2a for supplying $O_2$ necessary for the reaction to the heating oxidative decomposing reactor 2a, and a water pipe ($H_2O$ supply pipe) 6 connected to the heating oxidative decomposing. reactor 2a for supplying water (tap water or industrial water) necessary for the reaction to the heating oxidative decomposing reactor 2a. The tap water or the industrial water is purified up to a level of distilled water by a water purifier 7 connected to the water pipe 6, is then vaporized by a water vaporizer 8, and is supplied to the heating oxidative decomposing reactor 2a. Alternatively, water required for the reaction may be sprayed with a spray provided in the heating oxidative decomposing reactor 2a without being vaporized by the water vaporizer 8. In this case, the sprayed water is heated and vaporized in the heating oxidative decomposing reactor 2a. The heating oxidative decomposing section 2 has an electric tube furnace 9 made of ceramics which is provided around the heating oxidative decomposing reactor 2a. The electric tube furnace 9 serves as a heating device for heating the exhaust gas mixed with $O_2$ and water ($H_2O$) to a temperature ranging from 700 to 900° C. In the heating oxidative decomposing reactor 2a, oxidation of CO and decomposition of PFC having four or more carbon atoms, hydrofluorocarbon, and $NF_3$ are performed according to the following reaction formulas. Therefore, all of the components in the exhaust gas that are considered to be harmful to human bodies can be oxidized or decomposed.

$$2CO+O_2 \rightarrow 2CO_2$$

$$CO+H_2O \rightarrow CO_2+H_2$$

$$2H_2+O_2 \rightarrow 2H_2O$$

$$C_5F_8+4H_2O+3O_2 \rightarrow 5CO_2+8HF$$

$$C_4F_8+4H_2O+2O_2 \rightarrow 4CO_2+8HF$$

$$2C_4F_6+6H_2O+5O_2 \rightarrow 8CO_2+12HF$$

$$2CHF_3+2H_2O+O_2 \rightarrow 3CO_2+8HF$$

$$2NF_3+3H_2O \rightarrow NO+NO_2+6HF$$

In the oxidation, $O_2$ may be supplied from any $O_2$ sources such as atmospheric air, $O_2$-rich air, and pure $O_2$. Peroxide may be used as $O_2$. The aforementioned components in the exhaust gas can be oxidized and decomposed at a temperature ranging from 700 to 900° C. If the oxidation and decomposition are performed at a temperature of 1000° C. or higher, then an amount of thermal NOx caused by $N_2$ in the air is increased. When the oxidation and decomposition are performed at a temperature of 900° C. or lower, it is possible to economically select a fire-resistant element used in the heating oxidative decomposing reactor. Therefore, in the present embodiment, the oxidation and decomposition are performed at a temperature ranging from 700 to 900° C.

The post-treatment section 4 post-treats an acid gas such as HF which is produced in the decomposing process of fluorine compounds. In the present embodiment, the post-treatment section 4 comprises a water spray tower 4a for post-treatment. The water spray tower 4a is supplied with service water or industrial water, which is sprayed from a water spray 4b provided in the spray tower 4a. The exhaust gas is supplied into a lower portion of the water spray tower 4a and flows upward and into contact with the water sprayed from the water spray 4b. As a result, HF produced by the decomposition in the heating oxidative decomposing reactor 2a is removed from the exhaust gas. Instead of the water spray tower 4a, the post-treatment section 4 may comprise a fan scrubber, a gas passage stirring tank, or an adsorption tank filled with an adsorbent such as zeolite or activated carbon.

The fan scrubber, the gas passage stirring tank, and the adsorption tank can also achieve the aforementioned effects.

Figure 2:
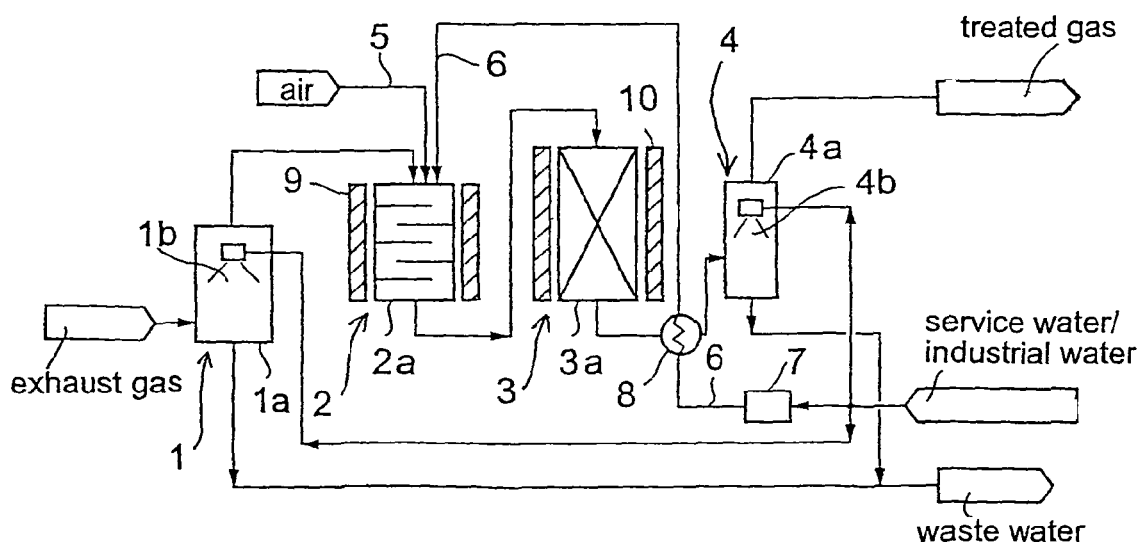
FIG. 2 is a block diagram showing an exhaust gas treatment apparatus according to a second embodiment of the present invention.

FIG. 2 shows an exhaust gas treatment apparatus according to a second embodiment of the present invention. As shown in FIG. 2, the exhaust gas treatment apparatus comprises a catalytic reaction section 3 for further decomposing an exhaust gas by catalytic reaction after the heating oxidative decomposition. The exhaust gas which has passed through the heating oxidative decomposing section 2 is successively introduced into a catalytic reactor 3a in the catalytic reaction section 3 and decomposed therein. The other structures of the present embodiment are the same as the structures of the exhaust gas treatment apparatus shown in FIG. 1.

The catalytic reactor 3a has a catalyst filled therein for decomposing PFC. The exhaust gas is introduced into an upper portion of the catalytic reactor 3a and flows downward from an upper catalyst layer to a lower catalyst layer. The catalytic reaction section 3 has an electric tube furnace 10 made of ceramics which is provided around the catalytic reactor 3a. The electric tube. furnace 10 serves as a heating device for heating the catalytic reactor 3a to a temperature ranging from 600 to 900° C. In the catalytic reaction section 3, PFC having three or less carbon atoms and $SF_6$ are brought into contact with the catalyst, so that the decomposition of PFC and $SF_6$ is performed according to the following reaction formulas. In the following reaction formulas, $O_2$ and water ($H_2O$) which contribute to the decomposition have been introduced into the system at the upstream heating oxidative decomposing reactor 2a. The catalyst comprises a catalyst for fluorine compounds, such as γ alumina or alumina zirconium composite material carried with tungsten oxide. Thus, PFC and $SF_6$ that are unlikely to be discomposed and has not been decomposed by the heat oxidative decomposing reactor 2a can be decomposed by the catalytic reaction section 3. Therefore, when the catalytic reaction section 3 is incorporated into the exhaust gas treatment apparatus, components that do not directly affect human bodies but adversely affect the global warming or the like can completely be removed from an exhaust gas.

$$CF_4+2H_2O \rightarrow CO_2+4HF$$

$$2C_2F_6+6H_2O+O_2 \rightarrow 4CO_2+12HF$$

$$C_3F_8+4H_2O+O_2 \rightarrow 3CO_2+8HF$$

$$2SF_6+3H_2O+O_2 \rightarrow SO_2+SO_3+6HF$$

Figure 3:
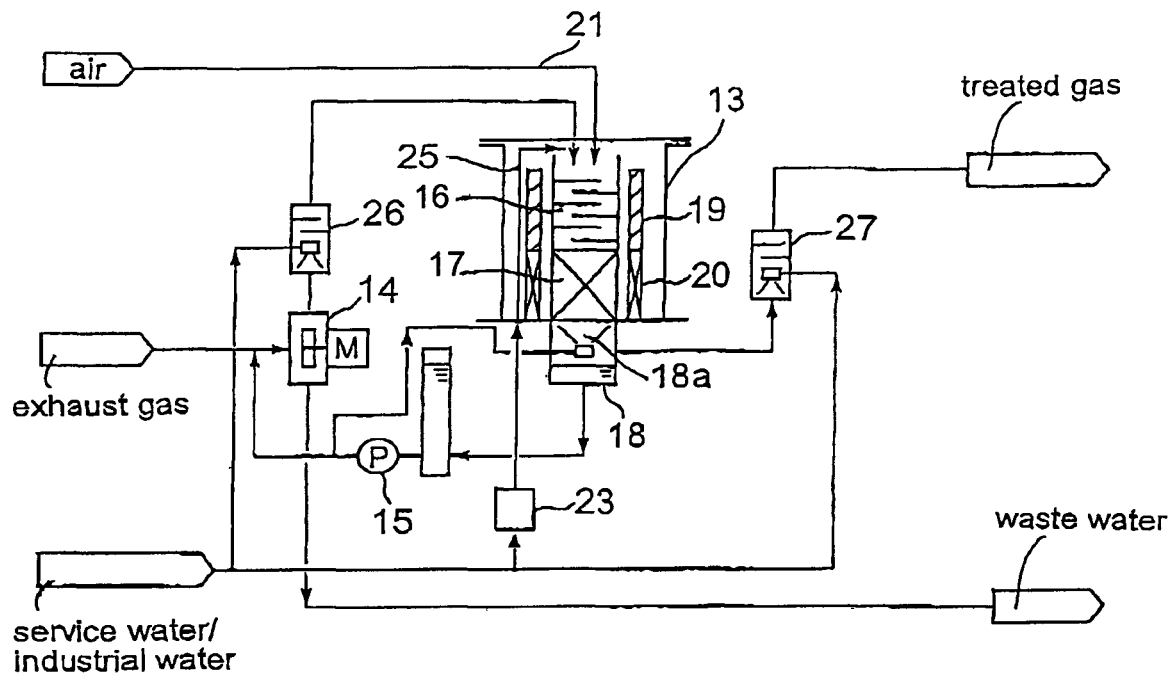
FIG. 3 is a block diagram showing an exhaust gas treatment apparatus according to a third embodiment of the present invention.

FIG. 3 shows an exhaust gas treatment apparatus according to a third embodiment of the present invention. As shown in FIG. 3, the exhaust gas treatment apparatus comprises a gas treatment reactor 13 into which a heating oxidative decomposing section, a catalytic reaction section, and a post-treatment section are integrally combined. The exhaust gas treatment apparatus has a fan scrubber 14 in a pre-treatment section. Scrubbing water is supplied to the fan scrubber 14 by a conveying pump 15. The scrubbing water and the exhaust gas are brought into contact with each other by rotation of a fan in the fan scrubber 14. As a result, powdery components, water-soluble components, or hydrolytic components are removed from the exhaust gas.

The gas treatment reactor 13 serves as a heating oxidative decomposing section, a catalytic reaction section, and a post-treatment section. Specifically, the gas treatment reactor 13 has a heating oxidative decomposing section 16, a catalytic reaction section 17, and a post-treatment section 18, in the downstream order of the flow of the exhaust gas. Thus, the heating oxidative decomposing section 16, the catalytic reaction section 17, and the post-treatment section 18 are integrally combined with each other to make the apparatus compact. Further, with the combined structure, the exhaust gas heated to 700 to 900° C. by an electric tube furnace 19 in the heating oxidative decomposing section 16 can be introduced into the catalytic reaction section 17 without being lowered in temperature. Therefore, the catalytic reaction section 17 requires no heating devices (e.g., heaters), but requires only a heat insulator 20 disposed therearound.

As shown in FIG. 3, the gas treatment reactor 13 has an air pipe 21 connected thereto for supplying $O_2$ required for the heating oxidative decomposition and the catalytic reaction. Water ($H_2O$) is purified up to a level of distilled water by a water purifier 23 and then supplied to the gas treatment reactor 13. The water introduced into the gas treatment reactor 13 flows through a water vaporization pipe 25 disposed outside of the outer surface of the electric tube furnace 19 in the gas treatment reactor 13. At this time, the water is heated and vaporized by heat exchange with exhaust heat of the electric tube furnace 19 and then introduced into the heating oxidative decomposing section 16 disposed at an upper portion of the gas treatment reactor 13. The post-treatment section 18 having a water spray 18a is provided at a lower portion of the gas treatment reactor 13, and scrubbing water is supplied to the water spray 18a in the post-treatment section 18 by the conveying pump 15.

The exhaust gas to be treated passes through the fan scrubber 14 for pre-treatment, then passes through a mist separator 26, and is introduced into the gas treatment reactor 13. The exhaust gas from which HF has been removed in the post-treatment section 18 passes through a mist separator 27, and is discharged as a harmless gas to the exterior.

Water ($H_2O$). is required for the oxidation of CO and the decomposition of PFC. In the present embodiment, water ($H_2O$) is introduced into the exhaust gas treatment system in a vaporized state. If the water contains Si or Ca, then Si or Ca may be deposited or scales may be produced when the water ($H_2O$) is vaporized, so that a clog may be caused in the apparatus. Further, Cl contained in the water may cause a catalyst to deteriorate. Therefore, the supplied water ($H_2O$) needs to be purified water such as pure water or distilled water. Accordingly, it is necessary to provide an independent pipe only for supplying pure water or distilled water to the apparatus, and also to provide an apparatus for producing pure water or an apparatus for producing distilled water separately. In this manner, installation cost of the apparatus is increased. In the present embodiment, since the apparatus has the water purifier for purifying water, service water or industrial water can be supplied directly to the apparatus. Therefore, the installation cost for providing pipes and the like can be eliminated.

A method of treating an exhaust gas according to the present invention will be described below.

In the pre-treatment process, powdery components, water-soluble components, or hydrolytic components are removed from an exhaust gas containing fluorine compounds and CO. The pre-treatment section for removing powdery components, water-soluble components, or hydrolytic components from the exhaust gas may comprise an adsorption tank for adsorbing the components into an adsorbing agent, a fan scrubber, a water spray tower, or a gas passage stirring tank.

The exhaust gas containing fluorine compounds and CO from which powdery components, water-soluble components, or hydrolytic components are removed in the pre-treatment process is brought into contact with $O_2$ and water ($H_2O$) at a temperature ranging from 700 to 900° C., so that CO is oxidized into $CO_2$ and fluorine compounds having four or more carbon atoms are decomposed. The heating oxidative decomposition is performed by the heating oxidative decomposing section, which has a hollow member for allowing the exhaust gas to pass therethrough, a heating device for heating the gas in the hollow member to 700 to 900° C., an inlet port for the gas to be treated, an inlet port for $O_2$, and an inlet port for water ($H_2O$)

The heating oxidative decomposing section should preferably have an additional device for enhancing the efficiency of contact of the exhaust gas with $O_2$ and water ($H_2O$), and the efficiency of heating. In this case, a turbulent flow of the exhaust gas is produced by the additional device for thereby enhancing the efficiency of contact of the exhaust gas with $O_2$ and water ($H_2O$). The additional device receives radiation heat produced by the heater to increase its temperature and its heat transfer area with the exhaust gas, for thereby enhancing the efficiency of heating. Thus, the heating oxidative decomposing section can be made small in size, and can use a heater having a small heating capacity.

Then, an acid gas (HF) which has been produced when fluorine compounds are decomposed in the heating oxidative decomposing section is removed from the exhaust gas. The removal of HF is performed by the post-treatment section such as an adsorption tank for adsorbing HF into an adsorbent, a fan scrubber, a water spray, or a gas passage stirring tank. With the above processes, the gas that are considered to be harmful to human bodies can completely be removed from the exhaust gas.

In order to remove undesirable components from the exhaust gas in view of the global warming, the decomposition by catalytic reaction may be performed after the heating oxidative decomposition. Specifically, in the catalytic reaction section, the exhaust gas may be brought into contact with $O_2$ water ($H_2O$) and a catalyst for decomposing fluorine compounds at a temperature ranging from 600 to 900° C. to thus decompose fluorine compounds having three or less carbon atoms and $SF_6$. The catalytic reaction section has a catalyst filled therein for decomposing fluorine compounds, and a heating device for heating a catalyst layer to a temperature ranging from 600 to 900° C. or a heat insulating member for keeping the gas which has been heated to 700 to 900° C. in the preceding heating oxidative decomposing section at a temperature ranging from 600 to 900°C.

The system may comprise a pure water producing apparatus, a distiller, or a filter mechanism for purifying water ($H_2O$) used for treatment of the exhaust gas. The system should preferably comprise a mechanism for vaporizing water ($H_2O$) supplied in a liquid phase by heat exchange with exhaust heat of the heating oxidative decomposing section or the catalytic reaction section. With this mechanism, since the exhaust heat is utilized for vaporization of water, the system requires no special heat source for vaporizing water ($H_2O$)

The catalytic reaction section should preferably have fillings made of ceramics at the downstream side of the catalyst layers. When the post-treatment section has a water spray, and the catalytic reaction section and the post-treatment section are integrally combined with each other, water sprayed from the water spray is prevented from reaching the catalyst layers by the fillings, and hence, the catalyst is prevented from being deteriorated. Since the water is held in spaces between the fillings, HF produced in the PFC decomposing process can efficiently be brought into contact with water, and hence, the rate of removal of HF and the cooling effect of the exhaust gas can be increased.

Next, test results of exhaust gas treatment with a testing apparatus equivalent to the exhaust gas treatment apparatus shown in FIG. 3 will be described below. An $N_2$ gas mixed with various types of gases to be treated was introduced into the testing apparatus, and the concentration of components in the gas was measured at a plurality of locations.

The gases to be treated comprised $SiF_4$, $CHF_3$, $C_4F_8$, $C_4F_6$, CO, $C_5F_8$, $NF_3$, $SF_6$ and $CF_4$. In this test, $SiF_4$ was supplied at a flow rate of 60 ml/min, $CHF_3$ 180 ml/min, $C_4F_8$ 60 ml/min, $C_4F_6$ 10 ml/min, CO 1200 ml/min, $C_5F_8$ 10 ml/min, $NF_3$ 120 ml/min, $SF_6$ 120 ml/min, and $CF_4$ 450 ml/min. These gases were mixed with the $N_2$ gas supplied at a flow rate of 120 ml/min and introduced into the testing apparatus. Air was introduced into the heating oxidative decomposing section at a flow rate of 3.0 l/min for supplying $O_2$ required for oxidation. Similarly, pure water was introduced into the heating oxidative decomposing section at a flow rate of 5 ml/min for oxidation and decomposition.

The concentration of components in the gas was measured at an inlet port of the testing apparatus (location A), an outlet of the pre-treatment section (location B), an outlet port of the heating oxidative decomposing section (Location C), and an outlet port of the post-treatment section (Location D) as listed below.

| Component | Location A | Location B | Location C | Location D |
|---|---|---|---|---|
| $CF_4$ (ppm) | 4180 | 3810 | 3350 | <0.2 |
| $CHF_3$ (ppm) | 1580 | 1490 | <0.2 | <0.2 |
| $C_4F_8$ (ppm) | 550 | 540 | <0.2 | <0.2 |
| $C_5F_8$ (ppm) | 69 | 62 | <0.2 | <0.2 |
| $C_4F_6$ (ppm) | 72 | 67 | <1 | <1 |
| CO (ppm) | 9100 | 8940 | <2 | <2 |
| $NF_3$ (ppm) | 940 | 925 | <1 | <1 |
| $SF_6$ (ppm) | 950 | 930 | 670 | <1 |
| HF (ppm) | — | <1 | — | <1 |
| $SiF_4$ (ppm) | 476 | <1 | — | — |

It can be seen from the above results that $SiF_4$ and HF were not substantially detected in the pre-treatment section and hence, an acid gas can efficiently be treated by the pre-treatment section. It can also be seen that CO, $C_4F_8$, $C_5F_8$, $C_4F_6$, $CHF_3$, and $NF_3$ were not substantially detected in the heating oxidative decomposing section and hence, such gases can efficiently be treated by the heating oxidative decomposing section. Further, $CF_4$ and $SF_6$ which had been detected at the outlet port of the heating oxidative decomposing section were not detected at the outlet port of the post-treatment section. Thus, $CF_4$ and $SF_6$ can efficiently be treated by the catalytic reaction section and the post-treatment section. Further, HF was not detected at the outlet port of the post-treatment section. Therefore, even if HF is produced in the catalytic reaction section, HF is efficiently treated by the post-treatment section.

Figure 4:
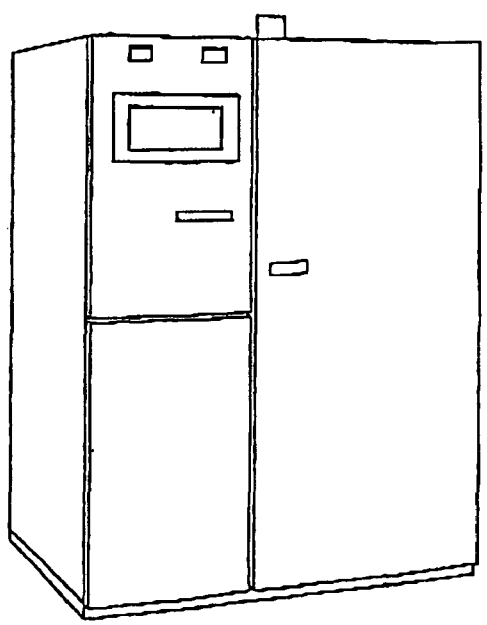
FIG. 4 is a perspective view showing an exhaust gas treatment apparatus shown in FIG. 1, 2 or 3.

FIG. 4 is a perspective view showing an exhaust gas treatment apparatus according to the present invention. The exhaust gas treatment apparatus shown in FIG. 4 may comprise all of the pre-treatment section, the heating oxidative decomposing section, the catalytic reaction section, and the post-treatment section. With such an exhaust gas treatment apparatus, water-soluble components, hydrolytic components, or powdery components, such as an acid gas and $NH_3$, can efficiently be removed together with PFC and CO from an exhaust gas at a low cost. Thus, the exhaust gas treatment apparatus according to the present invention has a high removal capability of reactive components and harmful components discharged from a semiconductor fabrication apparatus or the like. Further, the exhaust gas treatment apparatus has a compact structure, and hence, requires only small areas for installation and maintenance. Thermal NOx or the like is not discharged from the exhaust gas treatment apparatus, and the exhaust gas treatment apparatus ensures absolute safety, i.e., is remarkably safe as a device.

In the above example, the exhaust gas treatment apparatus comprises all of the pre-treatment section, the heating oxidative decomposing section, the catalytic reaction section, and the post-treatment section. However, the pre-treatment section and the post-treatment section may be provided separately from the exhaust gas treatment apparatus. Further, a post-treatment section may be provided for a plurality of exhaust gas treatment apparatuses, and may intensively treat an acid gas contained in an exhaust gas discharged from the plurality of exhaust gas treatment apparatuses.

As described above, according to the present invention, it is possible to efficiently and economically detoxify an exhaust gas containing a fluorine compound and CO which is discharged from a semiconductor fabrication apparatus.

The exhaust gas treatment method and apparatus are not limited to the illustrated examples. Although certain preferred embodiments of the present invention have been shown and described in detail, it should be understood that various changes and modifications may be made therein without departing from the scope of the appended claims.

The present invention is suitable for use in an apparatus for efficiently detoxifying an exhaust gas containing a fluorine compound and a carbon monoxide gas (CO) which is discharged in a semiconductor fabrication process such as a dry-cleaning process of an inner surface of a semiconductor fabrication apparatus or an etching process of various types of films such as oxide films.

The invention claimed is:

1. A method of treating an exhaust gas containing a fluorine compound and CO, the method comprising:
    removing at least one of a powdery component, a water-soluble component and a hydrolytic component from the exhaust gas;
    then adding $O_2$ and $H_2O$ to the exhaust gas;
    then heating the exhaust gas to a temperature ranging from 700 to 900° C., while causing the exhaust gas to contact a contact-enhancing device to thereby produce turbulent flow of the exhaust gas, to decompose the fluorine compound having four or more carbon atoms and to oxidize CO in the exhaust gas without catalytic reaction;
    then decomposing the fluorine compound having three or less carbon atoms by catalytic reaction at a temperature ranging from 600 to 900° C.; and
    removing an acid gas produced when the fluorine compound is decomposed.

2. A method according to claim 1, wherein at least one of the powdery component, the water-soluble component and the hydrolytic component is removed from the exhaust gas by adsorption with an adsorbent or by gas-liquid contact.

3. A method according to claim 1, wherein the acid gas is removed from the exhaust gas by adsorption with an adsorbent or by gas-liquid contact.

4. An apparatus for treating an exhaust gas containing a fluorine compound and CO, the apparatus comprising:
    a first treatment section for removing at least one of a powdery component, a water-soluble component and a hydrolytic component from the exhaust gas;
    a heating oxidative decomposing section having a contact-enhancing device for decomposing said fluorine compound having four or more carbon atoms and for oxidizing CO without catalytic reaction, said heating oxidative decomposing section being operable to heat the exhaust gas to a temperature ranging from 700 to 900° C., while causing the exhaust gas to contact the contact-enhancing device to thereby produce turbulent flow of the exhaust gas;

an $O_2$ supply for supplying $O_2$ to said heating oxidative decomposing section;

an $H_2O$ supply for supplying $H_2O$ to said heating oxidative decomposing section;

a catalytic reaction section for decomposing the fluorine compound having three or less carbon atoms by catalytic reaction at a temperature ranging from 600 to 900° C.; and a second treatment section for removing an acid gas in the resulting exhaust gas.

* * * * *